United States Patent Office 3,516,627
Patented June 23, 1970

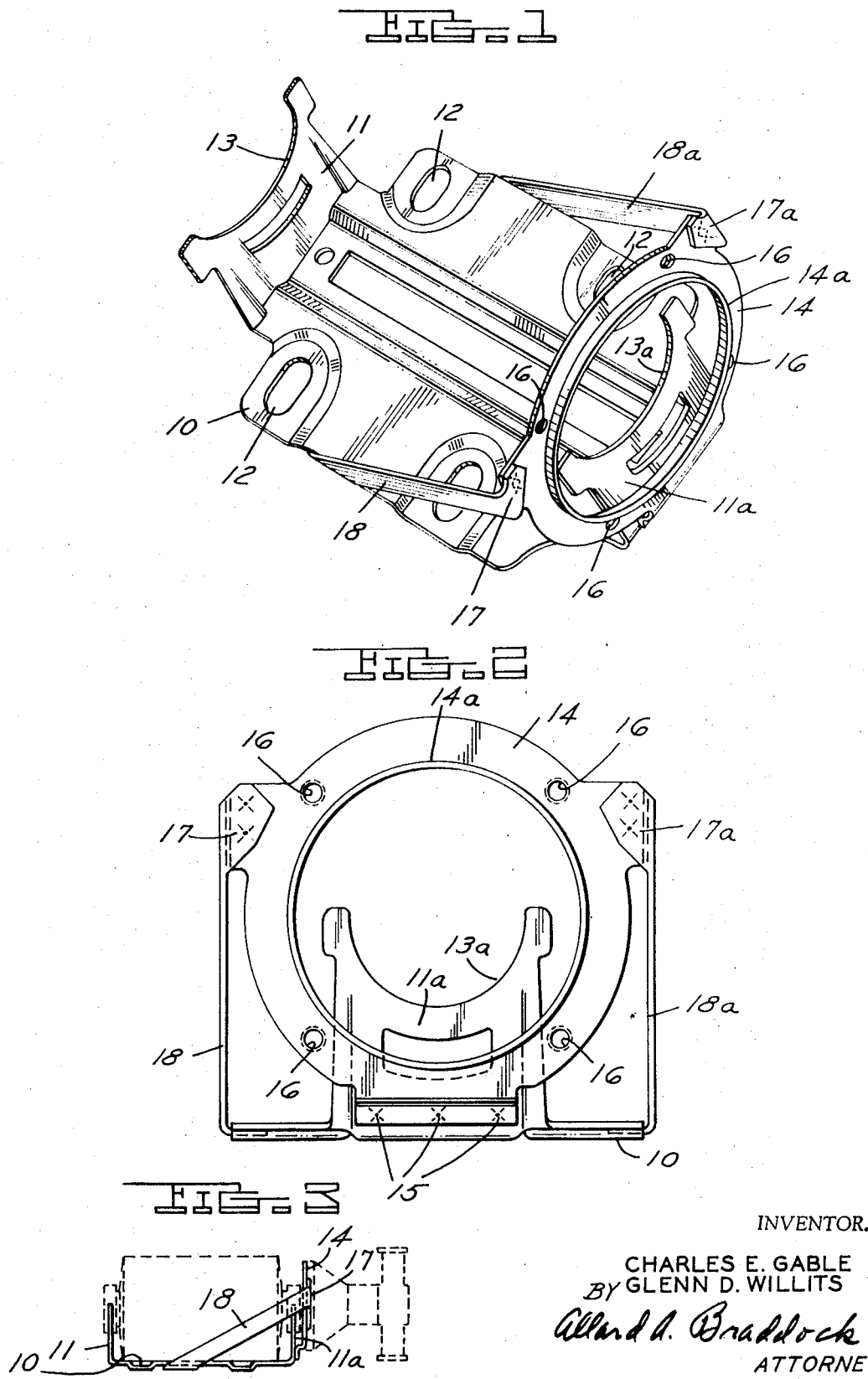

3,516,627
ELECTRIC MOTOR RESILIENT MOUNTING
FOR END ATTACHMENT
Charles E. Gable, Fort Wayne, and Glenn D. Willits,
Grabill, Ind., assignors to General Electric Company,
a corporation of New York
Filed Aug. 28, 1968, Ser. No. 756,025
Int. Cl. H02k 5/24
U.S. Cl. 248—15     6 Claims

ABSTRACT OF THE DISCLOSURE

A cradle-shaped electric motor mount consisting of a base plate portion and turned-up matching end portions of a type normally used for base-plate attachment is converted to end-attachment by providing an offset adapter attached to one of the end portions near the base-plate portion and side braces extending from the base-plate portion to tabs on the adapter located near the extremity thereof.

BACKGROUND OF THE INVENTION

Electric motors are normally sold with a mount which provides for base-mounting of the motor. A typical mount consists of a metal stamping having a base-plate portion which includes apertures for hold-down bolts and turned-up matching end portions cut out in a semicircular configuration to accommodate exteriorly grooved resilient parts attached to the end plates of motors. Such end-attached motors are used with certain pumps, garage door openers, etc. Since the same type of motor is used for both base-plate mounting applications and end-attachment applications, it is desirable that a motor resilient mounting means for base-plate attachment be adaptable as simply and easily as possible for end-attachment applications.

SUMMARY OF THE INVENTION

The invention is aimed at adapting a standard base-plate attachable motor mount to an end-attachable resilient motor mount. In accomplishing this end, an adapter part for end-attachment to an appliance is attached to one end portion of the mount near the base plate and braces are connected between the central portion of the base plate and the protruding end of the adapter. The parts can all be metal stampings of about the same thickness, for instance 100 mils for a motor of less than one horsepower rating, and all connections of parts can be by spot welding to give an end-attachable motor mounting providing the rigidity needed for support and resilience needed for isolating motor vibration. By using thicker sheet stock for large, heavy motors and thinner sheet stock for small, light motors, any vibration tendency on the part of the motor will be isolated at the mounting.

BRIEF DESCRIPTION OF THE DRAWING

The objects, features and advantages of the invention will appear more clearly from the following detailed description of the preferred embodiment thereof made with reference to the drawing in which FIG. 1 is a perspective view of the end-attachable motor mounting of this invention; FIG. 2 is a view of the motor mounting of FIG. 1 as it would be seen from the adapter end thereof; and FIG. 3 is a view of the mounting of this invention showing in dotted lines a motor mounted therein and pump attached thereto.

DESCRIPTION OF PREFERRED EMBODIMENT

A portion of the drawing illustrates a standard cradle-shaped motor resilient mount comprising a base plate portion 10 and matching end portions 11 and 11a. These parts are normally stamped from a single piece of sheet stock of about 100-mil thickness. The conventional base portion includes aperture slots 12 for accommodating anchor bolts (not shown) and the matching end portions terminate in semicircular cutouts 13 and 13a which accommodate a motor housing collar having grooved resilient rings as shown in FIG. 3; by way of exemplification, the type of resilient mounting disclosed in U.S. Pat. 3,235,653 issued on Feb. 15, 1966, to A. G. Ostrognai.

An adapter 14, here shown as a ring-shaped member having an alignment rabbet 14a, is fixedly attached to end portion 11a near the base plate thereof as by spot welds 15. The adapter 14 incorporates a plurality of apertures 16, preferably threaded, which serve to attach the motor mounting assembly to an appliance (shown by dotted lines in FIG. 3) which is to be driven by the motor also shown by dotted lines in FIG. 3. The alignment rabbet 14a is positioned to be coaxial with the motor and, by engaging a mating rabbet on the appliance to be driven by the motor, serves to center the motor shaft with respect to the appliance shaft.

The adapter 14 includes a pair of tabs 17 and 17a positioned near the protruding extremity thereof which serve as attachment bases for a pair of braces 18 and 18a which extend from the adapter 14 to the central portion of the base plate 10. The braces 18 and 18a are firmly anchored as by spot welding to the base plate 10 and the tabs 17 and 17a, respectively.

The end-attachable motor mounting of this invention constitutes an inexpensive and simple way to provide a strong yet resilient motor support. The adapter, braces and standard mount may all be stamped from metal sheet of the same thickness. If this thickness is about one-tenth of an inch in the case of a fractional horsepower motor, the mounting assembly will remain operational even under conditions where it is subjected to abuse. The assembly represents an efficient use of sheet metal stock as there is very little wastage.

While the invention has been described with reference to a specific embodiment, it is obvious that there may be variations which still fall within the true spirit of the invention. Accordingly, it is intended that the invention be limited in scope only as may be necessitated by the scope of the appended claims.

We claim:
1. An end-attachable electric motor resilient mounting comprising a generally cradle-shaped motor mount having a base plate portion and matching end portions for resilient-ring seating of an electric motor, an adapter member fixedly attached to one of said end portions near said base plate portion and externally positioned in offset relationship therewith for attaching said mount to a device to be driven by a motor positioned on said mount, and a brace extending from each side of the base plate portion of the motor mount to said adapter member at a point near the extended end of said adapter member.

2. An electric motor mounting as claimed in claim 1 wherein the thickness of stamped parts is correlated to the weight and size of a motor to be mounted therein whereby said mounting tends to isolate motor vibration.

3. An electric motor mounting as claimed in claim 1 wherein the braces extend at about a 45° angle with respect to the central portion and the adapter member.

4. An electric motor mounting as claimed in claim 1 wherein the adapter member has a plurality of threaded apertures and an alignment rabbet for attaching the mounting assembly to a rotatable device.

5. An electric motor mounting as claimed in claim 1 wherein the adapter member has a circular configuration with extending tabs to which the braces are attached.

6. An electric motor mounting as claimed in claim 1 wherein the parts are stamped from sheet stock of the same thickness.

References Cited

UNITED STATES PATENTS

| | | | |
|---|---|---|---|
| 2,057,370 | 10/1936 | Dehlendorf et al. | 310—51 X |
| 2,209,477 | 7/1940 | Reibel | 248—26 |
| 2,478,829 | 8/1949 | Lechtenberg. | |
| 2,939,627 | 6/1960 | Greiner | 248—15 X |

ROY D. FRAZIER, Primary Examiner

J. F. FOSS, Assistant Examiner

U.S. Cl. X.R.

248—26; 310—51, 91